(12) United States Patent
MacCready et al.

(10) Patent No.: US 10,694,529 B2
(45) Date of Patent: Jun. 23, 2020

(54) SWARM COMMUNICATION METHOD AND DEVICE

(71) Applicant: APIUM INC., Glendale, CA (US)

(72) Inventors: Tyler MacCready, Pasadena, CA (US); Karl Magnus Delight, Pasadena, CA (US); Alan Nise, Pasadena, CA (US)

(73) Assignee: APIUM INC, Glendale, CA (US)

( * ) Notice: Subject to any disclaimer, the term of this patent is extended or adjusted under 35 U.S.C. 154(b) by 58 days.

(21) Appl. No.: 15/786,965

(22) Filed: Oct. 18, 2017

(65) Prior Publication Data

US 2018/0110039 A1 Apr. 19, 2018

Related U.S. Application Data

(60) Provisional application No. 62/409,808, filed on Oct. 18, 2016.

(51) Int. Cl.
| | |
|---|---|
| *H04W 72/04* | (2009.01) |
| *H04W 74/08* | (2009.01) |
| *H04W 8/00* | (2009.01) |
| *H04W 72/02* | (2009.01) |
| *H04W 72/08* | (2009.01) |
| *H04W 84/18* | (2009.01) |
| *H04L 29/08* | (2006.01) |
| *H04W 64/00* | (2009.01) |
| *H04W 84/00* | (2009.01) |

(52) U.S. Cl.
CPC ......... *H04W 72/085* (2013.01); *H04W 8/005* (2013.01); *H04W 72/02* (2013.01); *H04W 72/048* (2013.01); *H04W 72/0446* (2013.01); *H04W 72/082* (2013.01); *H04W 74/08* (2013.01); *H04L 67/12* (2013.01); *H04W 64/006* (2013.01); *H04W 84/005* (2013.01); *H04W 84/18* (2013.01)

(58) Field of Classification Search
CPC . H04W 74/08; H04W 72/0446; H04W 72/02; H04W 8/005; H04W 74/082; H04W 72/085
See application file for complete search history.

(56) References Cited

U.S. PATENT DOCUMENTS

| | | |
|---|---|---|
| 5,974,236 A | 10/1999 | Sherman |
| 6,580,979 B2 | 6/2003 | Payton et al. |
| 6,904,335 B2 | 6/2005 | Solomon |

(Continued)

OTHER PUBLICATIONS

International Search Report and Written Opinion of the International Searching Authority, dated Jan. 12, 2018, Corresponding to PCT/US2017/057130, 16 pages.

*Primary Examiner* — Omer S Mian
(74) *Attorney, Agent, or Firm* — Lewis Roca Rothgerber Christie LLP

(57) ABSTRACT

A swarm communication system. Each of a plurality of transceivers determines a transmission cycle duration, and transmits one packet per transmission cycle, each packet being transmitted at a random point in time within the transmission cycle. The duration of the transmission cycle of a first transceiver may be adjusted according to the number of other transceivers within range of the first transceiver, or according to the number of other transmitters within range of each of the other transmitters that are within range of the first transceiver.

16 Claims, 9 Drawing Sheets

(56) References Cited

U.S. PATENT DOCUMENTS

| | | |
|---|---|---|
| 7,047,861 B2 | 5/2006 | Solomon |
| 7,082,351 B2 | 7/2006 | Hara et al. |
| 7,272,472 B1 | 9/2007 | McElreath |
| 7,283,893 B2 | 10/2007 | Hara et al. |
| 7,343,222 B2 | 3/2008 | Solomon |
| 7,409,266 B2 | 8/2008 | Hara et al. |
| 7,697,493 B2 * | 4/2010 | Ljungberg ............ G01S 5/0072 370/338 |
| 7,844,364 B2 | 11/2010 | McLurkin et al. |
| 7,894,948 B2 | 2/2011 | Stroud |
| 7,908,040 B2 | 3/2011 | Howard et al. |
| 8,112,176 B2 | 2/2012 | Solomon |
| 8,186,589 B2 | 5/2012 | Ben Asher et al. |
| 8,290,619 B2 | 10/2012 | McLurkin et al. |
| 8,692,705 B2 | 4/2014 | Smith et al. |
| 8,788,121 B2 | 7/2014 | Klinger |
| 8,804,649 B1 * | 8/2014 | Guan ................... H04W 48/18 370/252 |
| 8,820,678 B2 | 9/2014 | DeVaul et al. |
| 9,102,406 B2 | 8/2015 | Stark et al. |
| 9,104,201 B1 | 8/2015 | Pillai et al. |
| 9,320,080 B2 | 4/2016 | Marsden et al. |
| 2004/0030448 A1 | 2/2004 | Solomon |
| 2004/0030449 A1 | 2/2004 | Solomon |
| 2004/0030570 A1 | 2/2004 | Solomon |
| 2004/0030571 A1 | 2/2004 | Solomon |
| 2004/0068351 A1 | 4/2004 | Solomon |
| 2004/0068415 A1 | 4/2004 | Solomon |
| 2004/0068416 A1 | 4/2004 | Solomon |
| 2004/0134336 A1 | 7/2004 | Solomon |
| 2004/0134337 A1 | 7/2004 | Solomon |
| 2004/0162638 A1 | 8/2004 | Solomon |
| 2006/0079997 A1 | 4/2006 | McLurkin et al. |
| 2006/0198346 A1 | 9/2006 | Liu et al. |
| 2007/0093946 A1 | 4/2007 | Gideoni |
| 2007/0288132 A1 | 12/2007 | Lam |
| 2009/0103501 A1 * | 4/2009 | Farrag ................... H04W 74/02 370/337 |
| 2010/0034177 A1 | 2/2010 | Santhanam |
| 2010/0268409 A1 | 10/2010 | Vian et al. |
| 2011/0010446 A1 | 1/2011 | Chen et al. |
| 2012/0093087 A1 * | 4/2012 | Chen ..................... H04L 45/025 370/328 |
| 2013/0123981 A1 | 5/2013 | Lee et al. |
| 2013/0222115 A1 | 8/2013 | Davoodi et al. |
| 2013/0268654 A1 * | 10/2013 | Abraham ............ H04W 40/246 709/224 |
| 2014/0195150 A1 | 7/2014 | Rios |
| 2014/0274192 A1 * | 9/2014 | Zhu ...................... H04W 8/005 455/522 |
| 2015/0025797 A1 | 1/2015 | Hardesty et al. |
| 2015/0301529 A1 | 10/2015 | Pillai et al. |
| 2015/0331421 A1 | 11/2015 | Brunet et al. |
| 2016/0000511 A1 | 1/2016 | Hoffmann et al. |
| 2016/0025495 A1 | 1/2016 | Ashton |
| 2016/0026179 A1 | 1/2016 | Humenay |
| 2016/0202702 A1 | 7/2016 | Bruemmer et al. |
| 2016/0252908 A1 | 9/2016 | MacCready |
| 2017/0068243 A1 | 3/2017 | MacCready et al. |
| 2018/0294860 A1 * | 10/2018 | Hakola ................ H04B 7/0617 |

\* cited by examiner

SWARM COMMUNICATION METHOD AND DEVICE

CROSS-REFERENCE TO RELATED APPLICATION(S)

The present application claims priority to and the benefit of U.S. Provisional Application No. 62/409,808, filed Oct. 18, 2016, entitled "SELF-OPTIMIZING SWARM COMMUNICATION METHOD AND DEVICE", the entire content of which is incorporated herein by reference.

The present application is related to U.S. patent application Ser. No. 14/792,359, filed on Jul. 6, 2015, entitled "RECONFIGURABLE DRIFT MEASUREMENT TOOL", ("the '359 Application"), the entire content of which is incorporated herein by reference.

The present application is related to U.S. patent application Ser. No. 15/260,224, filed on Sep. 8, 2016, entitled "SWARM AUTOPILOT", ("the '224 Application"), the entire content of which is incorporated herein by reference.

FIELD

One or more aspects of embodiments according to the present invention relate to communications, and more particularly to a scalable system for communication over limited-range communications links between transceivers of a collection of transceivers.

BACKGROUND

Swarm robotics is an emerging technology field in which populations of autonomous agents coordinate their behavior through a distributed algorithmic architecture. In such swarms, there is a need for a robust, easily implementable, rapidly adaptive communication method that can accommodate the dense, complex and range-limited nature of robotic swarm communication. Specifically, the challenges of scalability, throughput, management, and monitoring are germane in the design or selection of a communication system for a swarm.

Scalability relates to the ability of the system to accommodate swarms with large numbers of agents. A swarm may consist of only a few agents, or of several hundred agents or more. A swarm may be an open system where the size of a swarm may quickly change as agents are added or removed while the swarm is operating. In such a situation it may be advantageous for the communication system not to rely on pre-coordination of agents. Furthermore, as the size of a swarm changes the appropriate rate for inter-agent communication may change, and it may be advantageous for agents to be able to self-adapt as the swarm size changes.

Throughput relates to the rate at which data can be transmitted between one agent and another or the total rate at which data is transmitted between agents in the swarm; the latter quantity may be referred to as "total throughput". Various combinations of signal attenuation and radio interference may limit the successful transmission of signals. As such, it may be advantageous for the communication system to be self-adjusting, e.g., continually adapting to achieve high throughput as the swarm reconfigures.

Management refers to control of the swarm by an operator. If agents in a swarm only communicate over short distances it may be challenging for an operator to manage the entire group, especially agents that are out of direct communication. As such, it may be advantageous for the communication system to enable the reliable dissemination of group commands and the creation of group-scale coherent behavior.

Monitoring refers to the ability of an operator to obtain information about the status and activity of the agents in the swarm. If the radio signals that the agents broadcast are only intended for short-distance communication with close neighbors, it may be challenging for an operator outside a swarm to efficiently monitor the activity of all the agents.

Existing technologies may be poorly suited for deployment in large swarms that may freely reconfigure, and in which it is advantageous to be able to add or remove vehicles without pre-planning and without disrupting the communication integrity of the swarm.

Thus, there is a need for an improved communication system for a swarm of agents.

SUMMARY

Aspects of embodiments of the present disclosure are directed toward a swarm communication system. Each of a plurality of transceivers determines a transmission cycle duration, and transmits one packet per transmission cycle, each packet being transmitted at a random point in time within the transmission cycle. The duration of the transmission cycle of a first transceiver may be adjusted according to the number of other transceivers within range of the first transceiver, or according to the number of other transceivers within range of each of the other transceivers that are within range of the first transceiver.

According to an embodiment of the present invention there is provided a method for communicating between a plurality of transceivers, the method including: establishing, by a first transceiver of the plurality of transceivers, a first transmission cycle interval having a duration; and transmitting, during the first transmission cycle interval, by the first transceiver, a packet, the position in time of the packet within the first transmission cycle interval being randomly selected, the establishing of the first transmission cycle interval including selecting the duration of the first transmission cycle interval based on: for each of a plurality of second transceivers, a count of transceivers within communication range of that second transceiver, the plurality of second transceivers being a subset of the plurality of transceivers, each of the second transceivers being within communication range of the first transceiver.

In one embodiment, the method includes determining, by a second transceiver of the plurality of second transceivers, the count of transceivers within communication range of that second transceiver by: during a first time interval having a duration of k transmission cycles of that second transceiver, k being a whole number greater than 2: receiving a plurality of packets; and adding, to a list of transceivers identifiers, a received transceiver identifier when the received transceiver identifier is not already in the list, removing, from the list each transceiver identifier not in any packet of the plurality of packets; and counting the number of transceiver identifiers in the list.

In one embodiment, the selecting of the duration of the first transmission cycle interval includes calculating the duration of the first transmission cycle interval to be proportional to an average, over the plurality of second transceivers, of the respective count of transceivers within communication range of each of the second transceivers.

In one embodiment, the selecting of the duration of the first transmission cycle interval includes calculating the duration D of the first transmission cycle interval according to the equation $D=N*T/B$ wherein N is the average, over the plurality of second transceivers, of the respective count of transceivers within communication range of each of the second transceivers, T is a duration of the packet, and B is a constant having a value between 0.1 and 4.0.

In one embodiment, the method includes: receiving, by the first transceiver, a packet including received stamp data and received mode data, the stamp data being a member of an ordered list; and when the received stamp data is later in the ordered list than stored stamp data in the first transceiver, overwriting the stored stamp data with the received stamp data, and overwriting stored mode data in the first transceiver with the received mode data; and when the received stamp data is not later in the ordered list than the stored stamp data in the first transceiver, leaving the stored stamp data and stored mode data unchanged.

According to an embodiment of the present invention there is provided a method for communicating between a plurality of transceivers, the method including: establishing, by a first transceiver of the plurality of transceivers, a first transmission cycle interval having a duration; and transmitting, during the first transmission cycle interval, by the first transceiver, a packet, the position in time of the packet within the first transmission cycle interval being randomly selected, the establishing of the first transmission cycle interval including selecting the duration of the first transmission cycle interval based on: a count of transceivers within communication range of the first transceiver; or for each of a plurality of second transceivers, a count of transceivers within communication range of that second transceiver, the plurality of second transceivers being a subset of the plurality of transceivers, each of the second transceivers being within communication range of the first transceiver.

In one embodiment, the selecting the duration of the first transmission cycle interval includes calculating the duration of the first transmission cycle interval to be proportional to the count of transceivers within communication range of the first transceiver.

In one embodiment, the selecting of the duration of the first transmission cycle interval includes calculating the duration D of the first transmission cycle interval according to the equation $D=N*T/B$ wherein N is the count of transceivers within communication range of the first transceiver, T is a duration of the packet, and B is a constant having a value between 0.1 and 4.0.

In one embodiment, the method includes: receiving, by the first transceiver, a packet including received stamp data and received mode data, the stamp data being a member of an ordered list; and when the received stamp data is later in the ordered list than stored stamp data in the first transceiver, overwriting the stored stamp data with the received stamp data, and overwriting stored mode data in the first transceiver with the received mode data; and when the received stamp data is not later in the ordered list than the stored stamp data in the first transceiver, leaving the stored stamp data and stored mode data unchanged.

According to an embodiment of the present invention there is provided a system, including: a plurality of spatially separated agents, each agent including a respective transceiver of a corresponding plurality of transceivers, a first transceiver of the plurality of transceivers being configured to: establish a first transmission cycle interval having a duration; and transmit, during the first transmission cycle interval, by the first transceiver, a packet, the position in time of the packet within the first transmission cycle interval being randomly selected, the establishing of the first transmission cycle interval including selecting the duration of the first transmission cycle interval based on: a count of transceivers within communication range of the first transceiver; or for each of a plurality of second transceivers, a count of transceivers within communication range of that second transceiver, the plurality of second transceivers being a subset of the plurality of transceivers, each of the second transceivers being within communication range of the first transceiver.

In one embodiment, the system includes determining, by a second transceiver of the plurality of second transceivers, the count of transceivers within communication range of that second transceiver by: during a first time interval having a duration of k transmission cycles of that second transceiver, k being a whole number greater than 2: receiving a plurality of packets; and adding, to a list of transceivers identifiers, a received transceiver identifier when the received transceiver identifier is not already in the list, removing, from the list each transceiver identifier not in any packet of the plurality of packets; and counting the number of transceiver identifiers in the list.

In one embodiment, the selecting of the duration of the first transmission cycle interval includes calculating the duration of the first transmission cycle interval to be proportional to the count of transceivers within communication range of the first transceiver.

In one embodiment, the selecting of the duration of the first transmission cycle interval includes calculating the duration D of the first transmission cycle interval according to the equation $D=N*T/B$ wherein N is the count of transceivers within communication range of the first transceiver, T is a duration of the packet, and B is a constant having a value between 0.1 and 4.0.

In one embodiment, the selecting of the duration of the first transmission cycle interval includes calculating the duration of the first transmission cycle interval to be proportional to an average, over the plurality of second transceivers, of the respective count of transceivers within communication range of each of the second transceivers.

In one embodiment, the selecting of the duration of the first transmission cycle interval includes calculating the duration D of the first transmission cycle interval according to the equation $D=N*T/B$ wherein N is the average, over the plurality of second transceivers, of the respective count of transceivers within communication range of each of the second transceivers, T is a duration of the packet, and B is a constant having a value between 0.1 and 4.0.

In one embodiment, the system includes: receiving, by the first transceiver, a packet including received stamp data and received mode data, the stamp data being a member of an ordered list; and when the received stamp data is later in the ordered list than stored stamp data in the first transceiver, overwriting the stored stamp data with the received stamp data, and overwriting stored mode data in the first transceiver with the received mode data; and when the received stamp data is not later in the ordered list than the stored stamp data in the first transceiver, leaving the stored stamp data and stored mode data unchanged.

In one embodiment, the system includes a sniffer including a directional antenna, having a gain, in one direction, of at least 5 dBi.

According to an embodiment of the present invention there is provided a system for providing communications to a swarm of vehicles, the system including a plurality of transceivers, a first transceiver of the plurality of transceivers being configured to: be mechanically and electrically connected to a vehicle; establish a first transmission cycle interval having a duration; and transmit, during the first transmission cycle interval, by the first transceiver, a packet, the position in time of the packet within the first transmission cycle interval being randomly selected, the establishing of the first transmission cycle interval including selecting the duration of the first transmission cycle interval based on: a count of transceivers within communication range of the first transceiver; or for each of a plurality of second transceivers, a count of transceivers within communication range of that second transceiver, the plurality of second transceivers being a subset of the plurality of transceivers, each of the second transceivers being within communication range of the first transceiver.

In one embodiment, the first transceiver is configured to send, to the vehicle, information about the location of other nearby transceivers of the plurality of transceivers.

In one embodiment, the first transceiver is configured to send, to the vehicle, a commanded velocity vector.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of exemplary embodiments of a swarm communication method and device provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
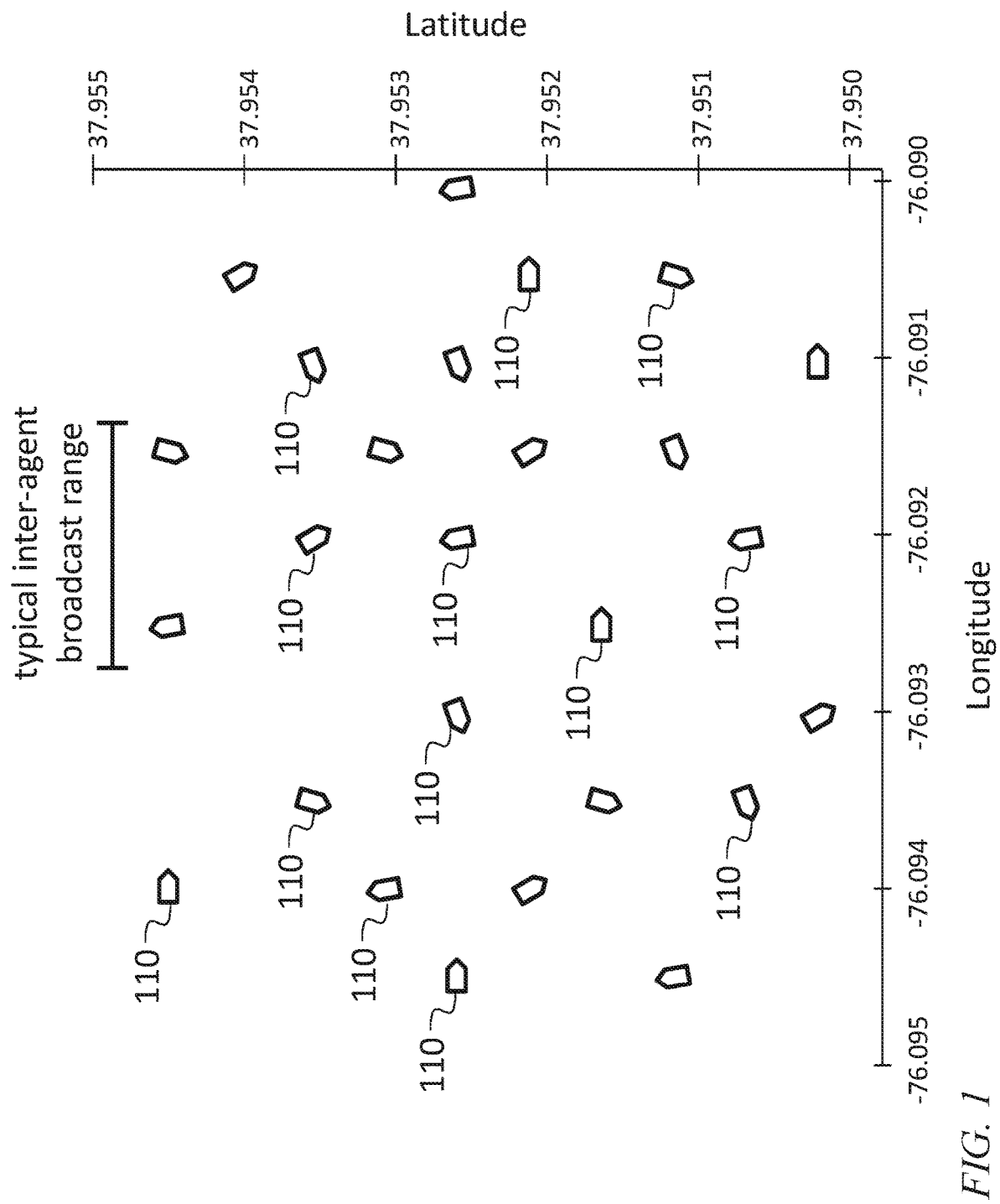
FIG. 1 is a map view of a distributed group of autonomous boats, according to an embodiment of the present invention.

In some embodiments a swarm includes a plurality of agents, such as the boats 110 illustrated in FIG. 1, each including a transceiver (e.g., a radio transceiver) for communicating with other agents and/or other entities such as an operator. In some embodiments the communication system includes the transceivers and one or more methods of operating them to reduce interference and to achieve acceptable throughput. As used herein, "throughput" is the rate at which one agent receives successful packets from one or more other agents. The number of agents in the swarm may be referred to as the "size" of the swarm, and the size of the region of space (e.g., the area) over which the swarm extends may be referred to as the "extent" of the swarm. The distance over which data may be successfully transmitted from one transceiver to another may depend on various factors, including the power of the transmitter, the gain of the receiving antenna, the sensitivity of the receiver, and the transmission loss between the transmitting antenna and the receiving antenna. The transmission loss between the transmitting antenna and the receiving antenna may be affected by obstacles (e.g., waves, if the agents are vehicles on the surface of a body of water). Two agents may be said to be within range of each other if signals may be reliably transmitted between them, in both directions. The extent of the swarm may be sufficiently great that some of the agents in the swarm may not be within range of some other agents in the swarm. This circumstance may both (i) be an obstacle to communications between widely separated agents and it may (ii) reduce the impact of interference between transmission from different agents in the swarm.

In some embodiments the communication system employs a distributed, de-centralized architecture that may have significant advantages over embodiments relying on central coordination. A distributed, de-centralized architecture may allow the extent of the swarm to be much larger than the communication range between agents, and, it may allow agents to rapidly make decisions in response to changes in local conditions, since they are not waiting for remote instructions. Further, such an embodiment may make it possible for the agents of the swarm to freely reconfigure their relative positions.

Some embodiments provide solutions to one or more swarm communications challenges, including, scalability, throughput, management, and monitoring. In such an embodiment, all agents may monitor the same, single radio channel or frequency. Each agent repeatedly openly broadcasts its relevant personal information (such as GPS location) in a packet that is small compared to the transmission cycle duration. The transmission cycle duration is consistent or slowly changing, e.g., 1 second, but within each cycle each agent chooses a random time to broadcast its packet, which may have a duration (e.g. 2 milliseconds) that is significantly smaller than the transmission cycle duration.

In some embodiments this mode of operation results in relatively frequent collisions, i.e., overlapping of signals from two or more different transmitters at any of the receivers, and resulting losses, but it nonetheless provides acceptable decipherable information (throughput) from non-colliding signals. The communications system of some embodiments is scalable and does not require that transceivers be synchronized.

The randomization of the packet transmission time within each transmission cycle facilitates the calculation of average values for offered load (number of packets broadcast), throughput (number of packets successfully received, i.e., non-colliding or non-overlapping packets) and channel utilization (fraction of available broadcast time used), which in turn makes it possible, using a simple method, for each agent to adjust its own transmission cycle duration in a way that results in adequate total throughput, even while the swarm size and extent change.

In some embodiments the communication system includes features that improve swarm functionality and management. For example, a "neighbor list", may be maintained by each agent; the list may include nearby agents even if a packet is not received from them with every cycle. As another example, a "command data" portion of the packet architecture may be utilized to reliably disseminate global information through the swarm. Further examples include an artificial parameter maintained by the agents that establishes unified gradients across the group for global management, and a monitoring system wherein rapid packet transmissions make it easy for an operator to monitor an entire swarm by quickly scanning with a directional receiving antenna.

In some embodiments, the communication system has four characteristics that result in desired capabilities:

1. The data packets have relatively short durations.
2. All broadcasts are open and one-way (i.e., one-to-many, not peer-to-peer).
3. The data packets are broadcast on a repeating transmission cycle the duration of which may be fixed or relatively slowly varying, and at a random time within each transmission cycle (referred to in this document as "cyclic-random" characteristic).
4. Radio range is limited.

For example, in one embodiment, a swarm includes thousands of agents (a small subset of which is illustrated in FIG. 1), each of which is a small boat 110. The swarm may be substantially larger than the radio broadcast range of any individual agent, which may be on the order of 150 meters. Each boat 110 detects its geographic location using an onboard Global Positioning System (GPS) receiver. Each boat 110 also is autonomous and able to navigate using an algorithm that plans a trajectory based on the relative position of close neighbors (i.e., it operates with a swarm algorithm). Each boat 110 has a transceiver (e.g., a 2.4 GHz radio) for sending and receiving signals. All boats 110 in the swarm use the same frequency.

Every broadcast packet may have the same generic structure shown in Table 1. This table shows a sample of the information that might be broadcast from each of the agents in FIG. 1 within one transmission cycle, which may have a duration of about 1 second. Each packet contains a vehicle-specific portion ("vehicle data") and a general portion ("command data"). The vehicle data includes an agent identifier, or, equivalently, a transceiver identifier (which may, for example, be a unique number or character), a position in a universal reference frame (here given by latitude and longitude) and possibly some other information such as a local environmental reading, an indicator of the agent's battery voltage, and an artificial parameter (e.g., an "A-value", described in further detail below). The command data, which may be used to spread information through the group, may be the same for all agents except when it is in the process of being updated as described below, with reference to FIG. 5. The command data may include a time-stamp (or "stamp data") of when the latest update occurred, a code (or "mode data") indicating a mode of operation such as "search" or "return home", and some additional information such as a latitude and longitude of the "home" location.

The generic packet structure allows each packet to be deciphered by any other boat 110 within radio transmission range. Each broadcast packet includes the transmitting boat's distinct identifier (agent identifier) and its GPS coordinates. It may also include some additional parameters such as environmental readings, or operational codes. The packet is relatively small, e.g., about 40 bytes. If a transmission baud rate of 250 kbps is used, then a packet may take less than 2 milliseconds to broadcast.

TABLE 1

| | Vehicle Data | | | | | | Command Data | | | |
|---|---|---|---|---|---|---|---|---|---|---|
| Agent | Latitude | Longitude | Neighbors | Environment | A-value | Battery | Time-stamp | Mode | Latitude | Longitude |
| A | 37.9545 | −76.094 | 12 | 16.2 | 110 | 11.7 | 12:23:56 GMT | [0 1 0] | 37.9688 | −76.0462 |
| B | 37.9545 | −76.0925 | 13 | 16.7 | 105 | 10.9 | 12:23:56 GMT | [0 1 0] | 37.9688 | −76.0462 |
| C | 37.9545 | −76.0915 | 4 | 17.3 | 103 | 11.2 | 12:23:56 GMT | [0 1 0] | 37.9688 | −76.0462 |
| D | 37.954 | −76.0905 | 16 | 17.6 | 101 | 11.2 | 12:23:56 GMT | [0 1 0] | 37.9688 | −76.0462 |
| E | 37.9535 | −76.0935 | 6 | 16 | 115 | 11.4 | 12:23:56 GMT | [0 1 0] | 37.9688 | −76.0462 |
| F | 37.9535 | −76.092 | 8 | 16.8 | 108 | 11.3 | 12:23:56 GMT | [0 1 0] | 37.9688 | −76.0462 |
| G | 37.9535 | −76.091 | 16 | 17.3 | 102 | 11.6 | 12:23:56 GMT | [0 1 0] | 37.9688 | −76.0462 |
| H | 37.953 | −76.094 | 13 | 15.9 | 120 | 11.7 | 12:23:56 GMT | [0 1 0] | 37.9688 | −76.0462 |
| I | 37.953 | −76.0915 | 7 | 17 | 106 | 10.7 | 12:23:56 GMT | [0 1 0] | 37.9688 | −76.0462 |
| J | 37.9525 | −76.0945 | 14 | 15.8 | 130 | 11.5 | 12:23:56 GMT | [0 1 0] | 37.9688 | −76.0462 |
| K | 37.9525 | −76.093 | 10 | 16.1 | 125 | 11.4 | 12:23:56 GMT | [0 1 0] | 37.9688 | −76.0462 |
| L | 37.9525 | −76.092 | 12 | 16.2 | 120 | 11.1 | 12:23:56 GMT | [0 1 0] | 37.9688 | −76.0462 |
| M | 37.9525 | −76.091 | 11 | 17.1 | 106 | 10.9 | 12:23:56 GMT | [0 1 0] | 37.9688 | −76.0462 |
| N | 37.9525 | −76.09 | 9 | 17.4 | 104 | 11.3 | 12:23:56 GMT | [0 1 0] | 37.9688 | −76.0462 |
| O | 37.952 | −76.094 | 6 | 15.6 | 140 | 10.8 | 12:23:56 GMT | [0 1 0] | 37.9688 | −76.0462 |
| P | 37.952 | −76.0915 | 8 | 16.3 | 115 | 11.6 | 12:23:56 GMT | [0 1 0] | 37.9688 | −76.0462 |
| Q | 37.952 | −76.0905 | 11 | 17.2 | 105 | 11.3 | 12:23:56 GMT | [0 1 0] | 37.9688 | −76.0462 |
| R | 37.9515 | −76.0935 | 15 | 15.6 | 160 | 11.2 | 12:23:56 GMT | [0 1 0] | 37.9688 | −76.0462 |
| S | 37.9515 | −76.0925 | 14 | 15.9 | 130 | 10.9 | 12:23:56 GMT | [0 1 0] | 37.9688 | −76.0462 |
| T | 37.951 | −76.0945 | 7 | 15 | 150 | 11.1 | 12:23:56 GMT | [0 1 0] | 37.9688 | −76.0462 |
| U | 37.951 | −76.0915 | 15 | 16 | 110 | 11.7 | 12:23:56 GMT | [0 1 0] | 37.9688 | −76.0462 |
| V | 37.951 | −76.0905 | 13 | 16.3 | 105 | 11.8 | 12:23:56 GMT | [0 1 0] | 37.9688 | −76.0462 |
| W | 37.9505 | −76.0935 | 13 | 15.2 | 140 | 11.7 | 12:23:56 GMT | [0 1 0] | 37.9688 | −76.0462 |
| X | 37.9505 | −76.092 | 12 | 15.6 | 120 | 10.8 | 12:23:56 GMT | [0 1 0] | 37.9688 | −76.0462 |
| Y | 37.95 | −76.093 | 8 | 15.4 | 130 | 11.1 | 12:23:56 GMT | [0 1 0] | 37.9688 | −76.0462 |
| Z | 37.95 | −76.091 | 7 | 15.5 | 105 | 11.3 | 12:23:56 GMT | [0 1 0] | 37.9688 | −76.0462 |

Figure 2:
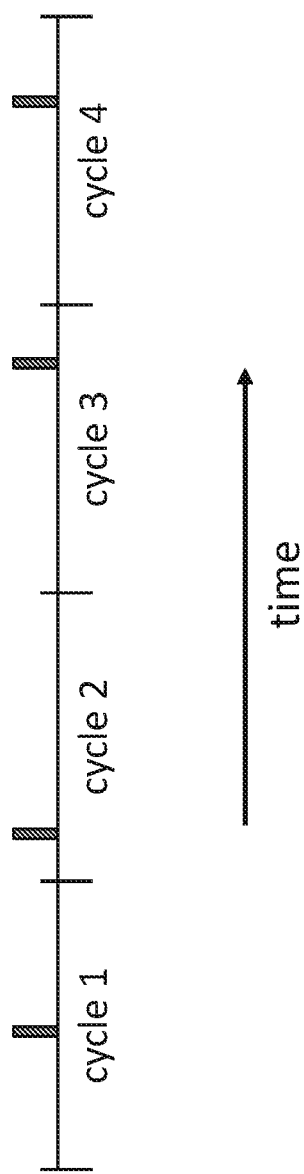
FIG. 2 is an illustration of a sequence of transmission cycles, each including a transmitted packet, according to an embodiment of the present invention.

In a simple configuration there may, for example, be a 1 Hz transmission cycle frequency common to all boats 110 in the swarm. As used herein, the "transmission cycle frequency" is the reciprocal of the transmission cycle duration. Each boat 110 broadcasts its most up-to-date packet information once within each transmission cycle. Rather than transmitting at a fixed time within each transmission cycle (or "transmission cycle interval"), each boat 110 transmits its packet at a random time, newly chosen within each transmission cycle, as illustrated in FIG. 2. For example, if the transmission cycle duration is 1 second, then on average the data packet frequency is 1 Hz, but the time between successive packet transmissions from a particular agent can vary between 0 and 2 seconds. As used herein, a "transmission cycle interval" is the interval of time over which the transmission cycle extends.

Figure 3:
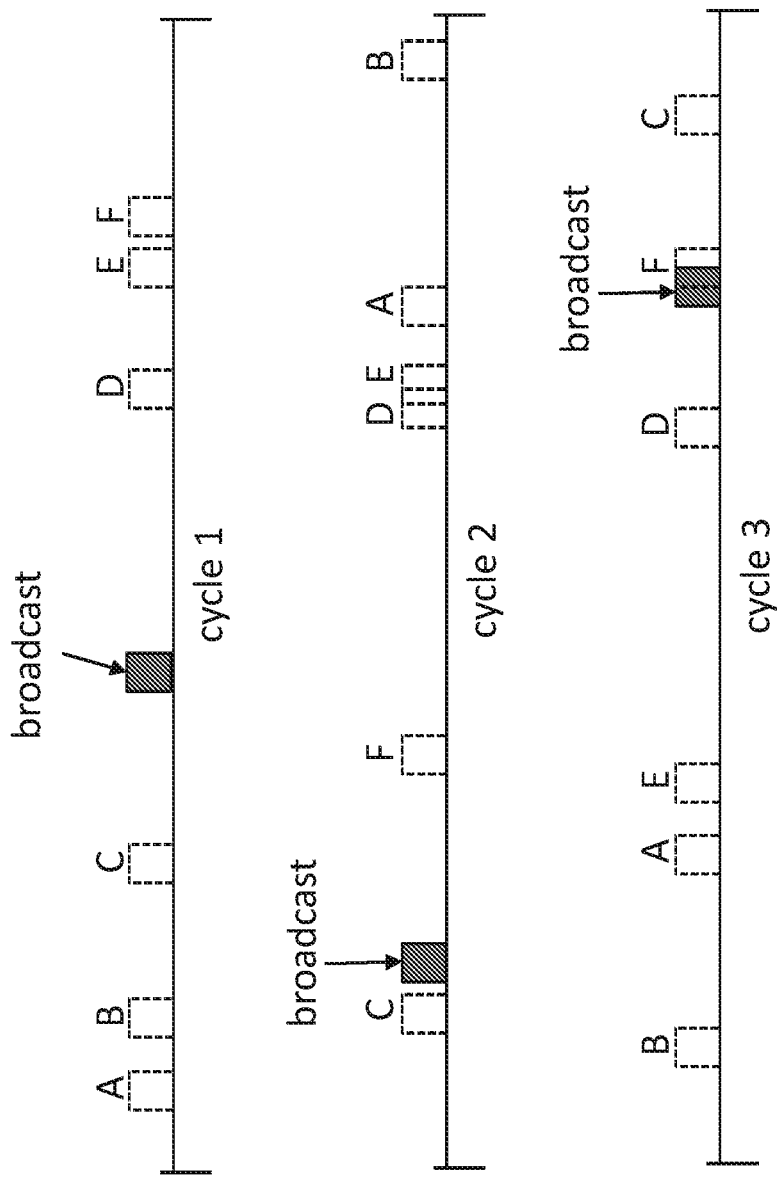
FIG. 3 shows three transmission cycles, each with a plurality of transmitted packets, according to an embodiment of the present invention.

FIG. 3 illustrates an example of when packets might be received from six neighbors within range of an agent. The duration of each packet is greatly exaggerated in FIG. 3 to demonstrate the effects of packet overlap. Broadcasts and receptions all occur once per cycle, but are randomly distributed within each cycle. In cycle 1 there is no packet overlap. In cycle 2 two incoming packets (D and E) overlap in time. As a result of this interference, neither packet can be parsed. In cycle 3 a packet (F) cannot be read because it arrives while the broadcast packet is being sent.

As illustrated in FIG. 3, the randomization of the packet transmission time within the transmission cycle interval avoids the persistent interference that could occur if transmissions were regularly timed.

The transmitted radio signals have a limited range, e.g., on the order of 150 meters, which is much smaller than the extent of the swarm. Thus, due to physical proximity, any one boat is only within radio range of at most a few hundred neighboring boats. When a boat is not transmitting, it uses its 2.4 GHz antenna to receive the broadcasts from all other boats within range.

In the case of a group of one hundred boats, all within radio range of each other, for example, each boat receives transmissions (or is itself transmitting) at most 20% of the time (one hundred packets, each having a duration of 2 milliseconds) within each one-second cycle. As a result, when any boat transmits its own packet there is an 80% chance that it will not be "talking over" another boat in the group, i.e. there will be no other broadcasts interfering with its transmission. With all boats having similar radio traffic, each boat successfully receives about 80% of the broadcast packets every second. Because the transmission schedule is randomized, the boats achieving successful transmission in one transmission cycle may be a different, randomly selected subset of the boats achieving successful transmission in any other transmission cycle, so after 2 seconds (two transmission cycles) each boat may have received at least one packet from about $1-0.2^2$, or about 96% of the other boats. After 3 seconds the proportion of other boats from which any boat has successfully received a packet is about $1-0.2^3$ or about 99%.

In a swarm having a static size, a more structured communication system may be capable of achieving higher throughput. However, if the swarm size varies, either as a result of allowing boats to join or leave the group or as a result of the changes in the extent of the swarm, a structured system may encounter challenges maintaining synchronization to prevent persistent interference. The use of cyclic-random operation may have the effect that any interference is temporary, even, for example, in a swarm of thousands of agents spread over several kilometers. The use of cyclic-random operation may also make it possible to add or remove boats from the swarm without pre-synchronizing them with the boats already in the swarm.

Self-Adjustment

In a swarm setting, neighboring agents constitute a sort of environment. An agent may have a sense of neighbors, particularly their relative positions, so it can constantly update its own position within the group. In some embodiments this information is provided in the form of broadcast packets containing GPS coordinates. The density of neighbors around any individual in a swarm may be a balance between a density that is sufficient for neighbors to carry out well-defined swarm algorithm calculations but not so great that there is excessive radio interference.

In some swarm settings the density may be too small or too great. For example, when deploying or retrieving a swarm, the density of agents may be very high, potentially causing excessive radio interference (from overlapping packets) which if not remedied could result in each agent's having insufficient information about the neighbor environment. Conversely, if the density is small, the bandwidth may be underutilized.

It is possible to devise an adjustment scheme, using cyclic-random communication, that meets the conditions of being fully scalable, rapidly adaptive, and not reliant on any forced communication coordination between agents. The statistical reliability of the cyclic-random communication system lets agents self-adjust their transmission cycle duration in a way that results in high throughput in the group as a whole.

Within a swarm the basic goal may be for each agent to obtain as much current information about its neighbors as possible. Because packets are coming in at random from all neighbors this is equivalent to the goal that each agent successfully receive as many packets per second as possible. The number of successfully received packets per second is referred to herein as the "successful packet rate", or, as mentioned above, "throughput".

Figure 4:
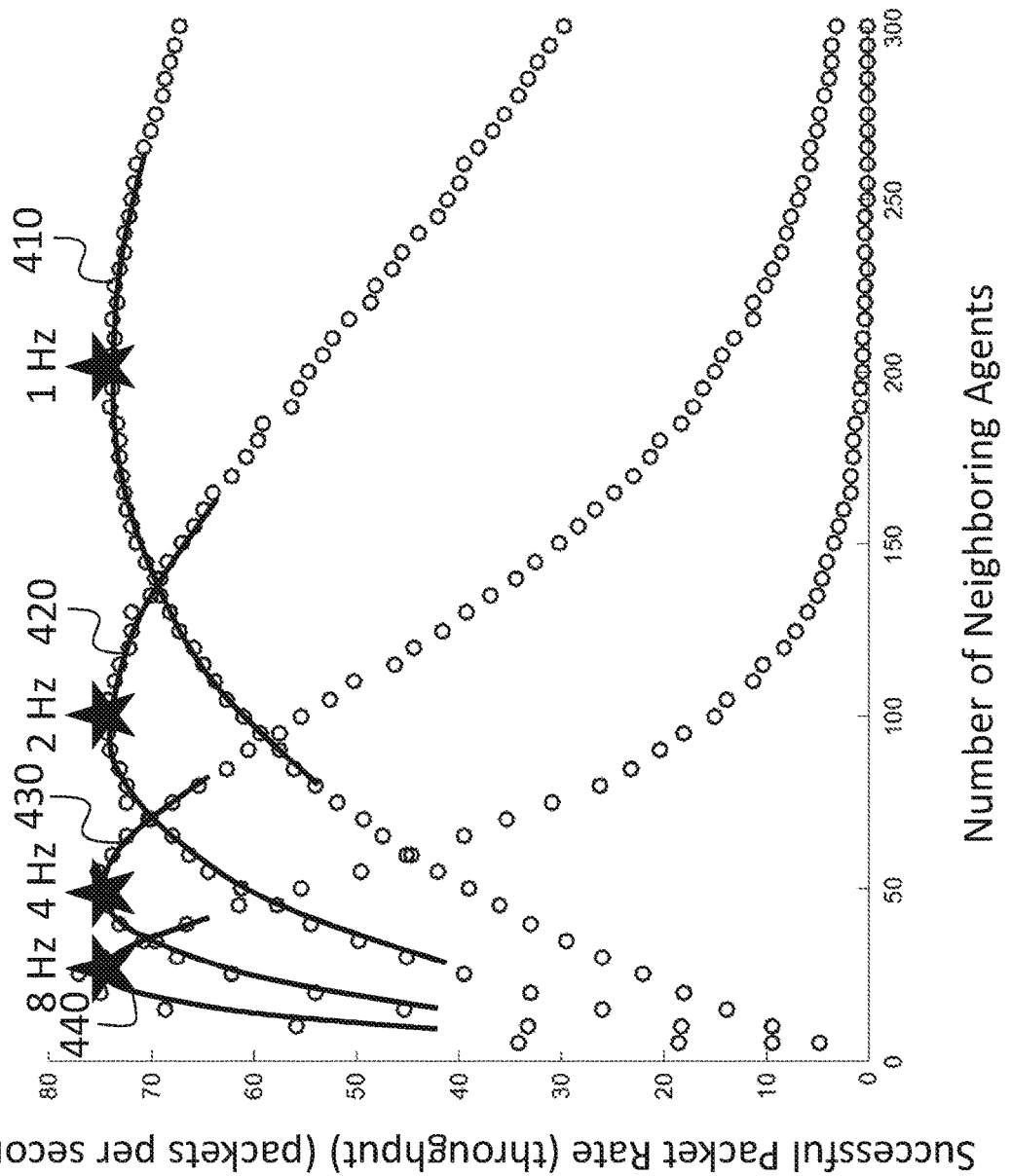
FIG. 4 is a graph of successful packet rate as a function of local population size, for four different transmission cycle frequencies, according to an embodiment of the present invention.

FIG. 4 is a graph of throughput as a function of local population size (number of neighbors within range), for four different transmission cycle frequencies: 1 Hz (curve 410), 2 Hz (curve 420), 4 Hz (curve 430), and 8 Hz (curve 440). The four curves show the number of packets that are successfully received by a single agent per unit time (throughput). The curves are constructed experimentally by averaging the results from several computer-simulated trials for different transmission rates (1 Hz=1.0 second cycle duration, 2 Hz=0.5 second cycle duration, 4 Hz=0.25 second cycle duration, 8 Hz=0.125 second cycle duration) and for groups of different sizes. In these simulations the packet duration is two milliseconds. As shown in FIG. 4, for each transmission rate there is a maximum rate of clear packets received per second (about 75). This maximum throughput corresponds to a particular number of neighbors within communication range.

FIG. 4 shows that for a given packet duration and transmission cycle duration there is a particular local population size (number of neighbors within range) that results in the greatest throughput. For a packet duration of 2 milliseconds the greatest throughput is about 75 packets per second, regardless of which of the four different transmission cycle frequencies is used. The transmission cycle frequency at which the greatest throughput is achieved depends on the number of neighbors. Thus, in some embodiments an agent self-adjusts its transmission cycle frequency by noting its neighbor count and adjusting its transmission cycle frequency using the following equation:

transmission cycle frequency=0.4/(number of neighbors*packet duration), where the transmission cycle frequency has units of cycles per second and the packet duration has units of seconds. If all agents set their own transmission cycle frequency in real time according to this equation, the total throughput for the swarm of agents may be maximized without the agents having to coordinate between themselves. In some embodiments a factor different from 0.4 (e.g., a factor in the range between 0.1 and 4.0) is used instead of the factor of 0.4 in the equation above.

In a region of a swarm in which the density of agents is not uniform, an additional improvement to this method for adjusting the transmission cycle frequency may be achieved if one of the pieces of information that neighbors share is the number of neighbors they are receiving signals from. Sharing this information may avoid a situation in which a first agent, which has few neighbors, transmits at a high transmission cycle frequency and thereby causes excessive interference to a second agent, which is a neighbor of the first agent and which has many neighbors. In such a situation it may be that a lower transmission cycle frequency from the first agent would result in a higher throughput for the second agent.

The number of neighbors from which an agent is receiving packets may be included in the agent's broadcast packet. With this information, each agent can calculate the average "crowding" (i.e., neighbor count) of the population into which its outgoing packet will be broadcast, and it may adjust its transmission cycle frequency to maximize throughput in the group. A similar equation may be used by a first agent to adjust its transmission cycle frequency, in this case:

transmission cycle frequency=0.4/(average neighbor count over neighbors*packet duration)

where the transmission cycle frequency has units of cycles per second and the packet duration has units of seconds, and where the average neighbor count over neighbors is the average of the neighbor counts of all of the agents that are neighbors of the first agent. A "neighbor count" of an agent, as used herein, refers to the number of agents listed in a neighbor list maintained by the agent (as described in further detail below). In some embodiments a factor different from 0.4 (e.g., a factor in the range between 0.1 and 4.0) is used instead of the factor of 0.4 in the equation above.

Neighbor List

As mentioned above, each agent in a swarm may be aware of its close neighbors and constantly update its own behavior (e.g. its own geographic location or its spatial relationship within the group) based on a swarm algorithm calculation that uses vectors describing the relative positions of neighbors. Each agent may have concurrent or simultaneous awareness of all of its neighboring agents. Each agent may maintain a list of relative positions and possibly other neighbor information such as environmental readings or velocity vectors.

When all of this neighbor information is received in the form of discrete radio packets broadcast at different times, some of which may be lost due to interference or fluctuating link loss, an agent's awareness of its neighbors may be imperfect, e.g., delayed for at least some neighbors. A neighbor list, which may be maintained by the agent to be as complete and current as possible, may be employed to mitigate some of these effects.

The neighbor list may be constructed using the ID numbers and GPS coordinates gleaned from neighbor packet broadcasts. Construction of the neighbor list is based on the observation that agents in a real swarm, such as robotic boats on the ocean surface, may have a persistent physical presence and any significant change in their position generally occurs much more slowly than the packet transmission rate, e.g. 1 Hz. As a result, if in one one-second window a neighbor's location is discerned from the GPS data in its packet, it can be reasonably assumed that that neighbor is still there during the next second even though its next transmitted packet may have been missed. However, with each passing second during which additional packets from a neighbor are expected but not received, the reliability of its position decreases.

In one embodiment a neighbor list is created by adding agents to the list when packets are received, updating the information for each agent whenever a new packet is received from it, and dropping an agent from the list after a certain time (referred to as a "persistence duration") has elapsed without a new packet. Table 2 shows the evolution of such a neighbor list in one embodiment, for a first agent having seven neighbors (identified by letters, e.g., "O", "K", "S", etc.), from each of which it has just received a packet, in cycle 1. In cycle 2, new packets are received from agents O, K, W, J, and Y, but not from agents S and T. The same occurs in cycle 3. Also, in cycle 3, the first agent receives a packet from agent H and adds agent H to the neighbor list. In cycle 4 a counter is reset when an updated packet from agent S is received. At the end of cycle 6, not having received a packet from agent T in five consecutive cycles, which may correspond to the persistence duration, the first agent removes agent T from the neighbor list.

TABLE 2

| Cycle 1 | | Cycle 2 | | Cycle 3 | | Cycle 4 | | Cycle 5 | | Cycle 6 | |
|---|---|---|---|---|---|---|---|---|---|---|---|
| Neighbor ID | cycles since new packet | NeighBor ID | cycles since new packet | Neighbor ID | cycles since new packet | Neighbor ID | cycles since new packet | Neighbor ID | cycles since new packet | Neighbor ID | cycles since new packet |
| O | 0 | O | 0 | O | 0 | O | 0 | O | 1 | O | 2 |
| K | 0 | K | 0 | K | 0 | K | 0 | K | 0 | K | 0 |
| S | 0 | S | 0 | S | 1 | S | 2 | S | 0 | S | 0 |
| W | 0 | W | 0 | W | 0 | W | 0 | W | 0 | W | 0 |
| T | 0 | T | 0 | T | 1 | T | 2 | T | 3 | J | 0 |
| J | 0 | J | 0 | J | 0 | J | 0 | J | 4 | Y | 0 |
| Y | 0 | Y | 0 | Y | 0 | Y | 0 | Y | 0 | H | 0 |
| | | | | H | 0 | H | 0 | H | 0 | T is dropped | |
| | | | | H is added | | S is restarted | | | | | |

In another embodiment, when a new packet is not received from a neighbor, the relative coordinates of that neighbor are updated (or the absolute position is updated)

with each cycle, to reflect the expected motion of the neighbor, either using the last broadcast velocity vector, or using an estimated velocity calculated from position changes recorded from the last 2 or 3 received packets.

In some embodiments, the persistence duration is longer than the cycle duration. If the persistence is too short (e.g. less than 2 cycles) the neighbor list may be incomplete. If the persistence is too long (e.g. greater than 10 cycles), much of the information about neighbors in the list may not be sufficiently accurate or reliable to be of value for a swarm calculation.

The neighbor list may be an internal representation, in each agent, of all the information it has about its neighbors, including, e.g., information about the positions and respective environments of its neighbors. As such, each agent may use the neighbor list, for example, to compute navigation vectors from swarm calculations, or to make any other assessment of the environment of neighbors. Further, as mentioned above, the neighbor count may be determined by counting the number of neighbors on the neighbor list; this number may be included in the agent's broadcast packet to assist other agents with their transmission cycle frequency calculations.

Command Data

Agents in a swarm that are not within range of each other are not in direct contact with each other, and, in some circumstances there may be no central controller that is in direct communication with all agents simultaneously. It may however be desirable or advantageous for an operator, or a single agent in the group, to be able to send a command to the entire group, such as a directive to change behavioral modes from "search" to "converge" or from "standard operation" to "emergency stop". Since inter-agent communication is local, not global, a second portion of the packet may be defined that includes information that is repeated from agent to agent.

This Command Data portion of each packet may include two key elements. First it may include a byte or a few bits that identify a "mode". For example [001] might identify "normal swarm behavior", [010] could identify "converge on a specified geographic location", [111] could identify "emergency stop". Supporting information, such as a specific GPS location, may also be included in this global portion of a packet. Second there may be another segment of the packet ("stamp data") that is a member of an ordered list, e.g., it may be a serial count (stamp) of every operator command, or a time stamp in a global frame (such as GMT monitored from the GPS signal) of when a command is given. As used herein, values that are "members of an ordered list" are ones for which it is possible for a transceiver to determine which of two such values precedes the other (i.e., is earlier in the ordered list than the other). A monotonically increasing list of numbers (such as a sequence of time stamps) is an example of an ordered list, as is a monotonically decreasing list of numbers.

Figure 5:
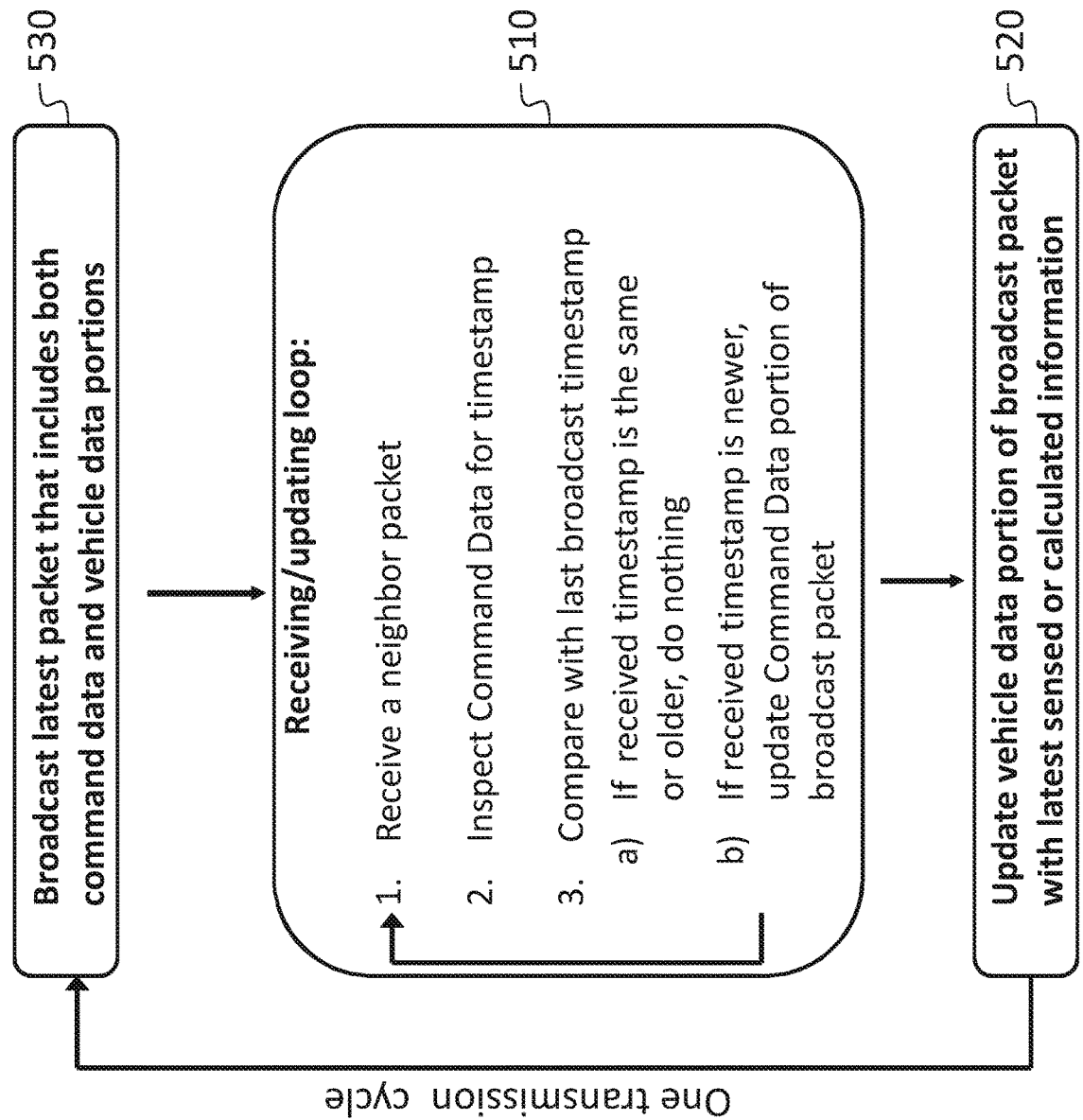
FIG. 5 is a flowchart of a method for handling command data, according to an embodiment of the present invention.

FIG. 5 is a flowchart of a method for handling command data, in one embodiment. The command data may include information to be repeated in successive transmissions, such as a general command or a mode that is to be propagated throughout the swarm. The vehicle data may include the most current information specific to the agent transmitting the packet, such as the agent's current location, velocity or latest environmental reading. During each cycle, the agent executes a receiving/updating loop 510, for each received packet, as follows. When the agent receives a new packet it compares the stamp in that packet with the stamp of its current mode. If the stamp is the same or older the agent stays in its current mode and broadcasts its existing stamp and mode in its outgoing packet. If the stamp is newer the agent begins operating in the mode associated with the newer stamp, updates, in an act 520, the vehicle data portion of the packet, and broadcasts, in an act 530, the newer stamp and mode in the command data portion of its outgoing packet, together with the vehicle data portion. As such, the agent operates on the basis of the most up-to-date mode.

In such an embodiment, when an operator sends a command that is only received by a single agent or by a few agents, the command may rapidly disseminate through the swarm. Also, a second operator, out of communication with the first, may change the mode. Further, an agent may also be the initiator of a new global command. For example, if the swarm is in "search" mode where it is widely spread out and monitoring for the ping from a black box, then when one agent senses the box, it can broadcast its GPS coordinates along with a new "converge" command so all agents move toward the target location (e.g., toward the agent that sensed the box or toward the inferred location of the box).

Because the self-adjustment of transmission cycle frequency described above maximizes the packet communication rate within the swarm, it also maximizes the speed with which command data disseminates through the group.

Artificial Topography

As mentioned above, environmental readings, such as water temperature, can be broadcast in packets. With several such readings tied to neighbors' geographic locations, it is possible for agents to calculate gradients in the environment around them. This sort of distributed sensing is one of the powerful capabilities of a robotic swarm. These gradients may be used to influence the motive vector of each agent, and the sum result may be a swarm that migrates very effectively up or down regional environmental gradients.

Figure 6:
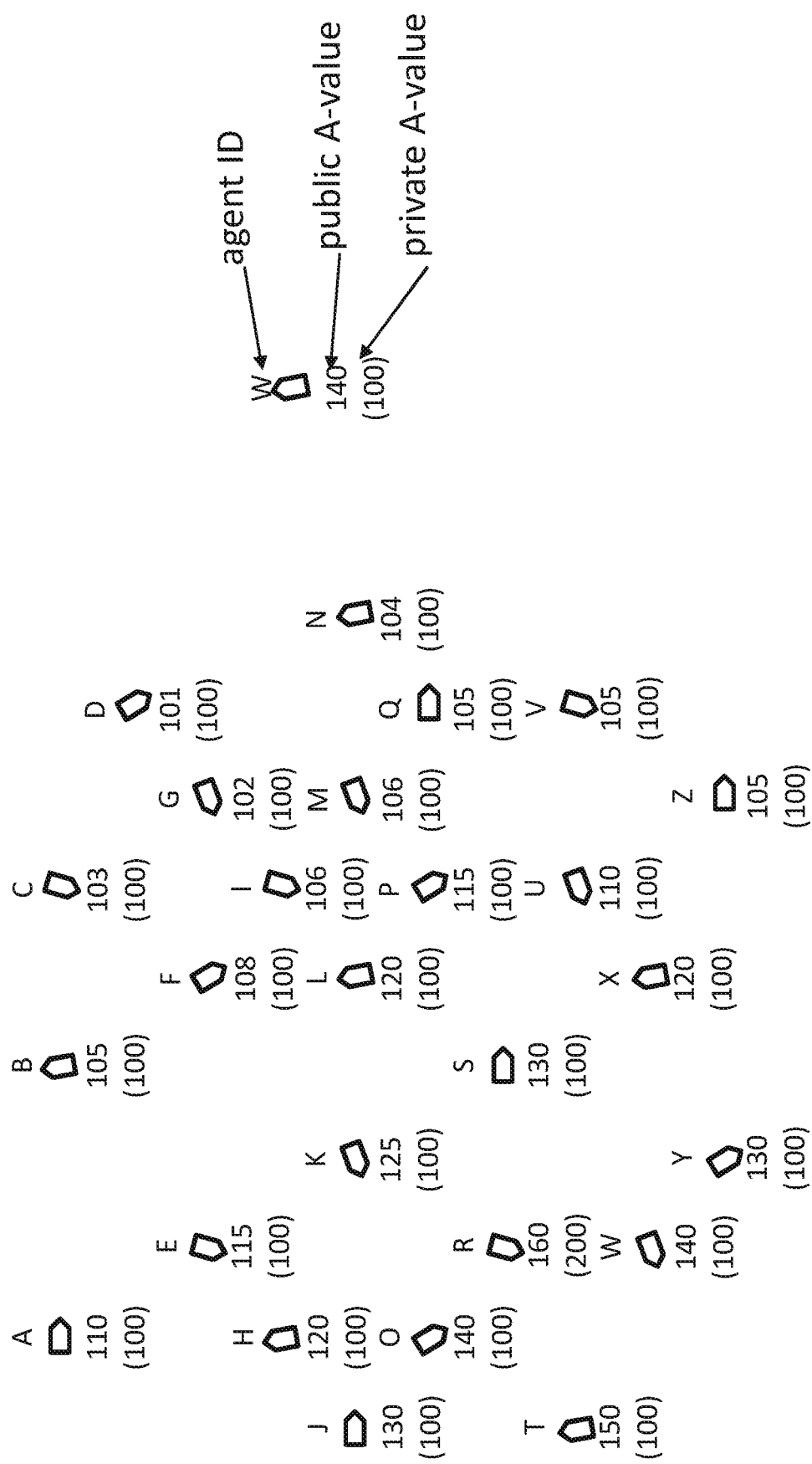
FIG. 6 is a map view of a swarm of agents each maintaining two parameter values, according to an embodiment of the present invention.

The packet broadcast system also provides a medium for an artificial topography that may be used as a global pointer within the distributed swarm, as described in further detail in the '224 Application. For example, as illustrated in FIG. 6, each agent may maintain two parameter values, a private A-value, and a public A-value, the latter of which is transmitted with each packet transmitted by the agent. During each transmission cycle, each agent recalculates its public A-value as the average of (i) the A-values it has received from its neighbors and (ii) its private A-value (and then includes the recalculated public A-value in the next packet it transmits). FIG. 6 shows exemplary values of the public A-value (below each agent) and the private A-value (below each agent, in parentheses).

In operation, if all agents have the same private value, e.g. 100, then all averaged A-values are 100 and all of the public A-values are 100. In this scenario there is no gradient in the spatial distribution of A-values and they form a flat topography. However, if one agent is assigned a different private A-value, e.g. 200, (this value being, e.g., self-assigned as a result of the agent's detecting an anomaly or intentionally assigned by an operator), then the averaging and broadcasting process forms a gradient in the public A-values sloping from that one agent outwards.

This topography, generated entirely by the local communication system, forms a robust regional gradient pointing toward the agent of interest. The averaging process diffuses the gradient across the swarm, and even remote agents can detect the direction toward the agent with the larger private A-value. This directionality may be used in action decisions by every agent, for example to converge on the location of the agent with the larger private A-value, without needing a direct or quantitative reading from the agent with the larger private A-value.

Because the self-adjustment described earlier in this document maximizes the packet communication rate within the swarm, it therefore maximizes the speed with which the topographic gradient disseminates and smoothes itself. The self-adjustment improves the formation of a consistent, reliable gradient that can be a useful swarm management tool.

Sniffer

In some embodiments, swarming is based on short-range communication, and it may be challenging for an operator to obtain information from distant agents. In some distributed systems, remote information is transmitted through a chain of intermediaries. This is technologically challenging in a dynamic network, and may be slow because information from distant agents may be relayed by a large number of intermediaries, and because all of the information conveyed to the operator may pass through a small number of agents in a neighborhood of the operator, which may form a bottleneck. In some embodiments, an open broadcast system as described herein lends itself to a different method that is flexible and imposes relatively little delay.

Figure 7:
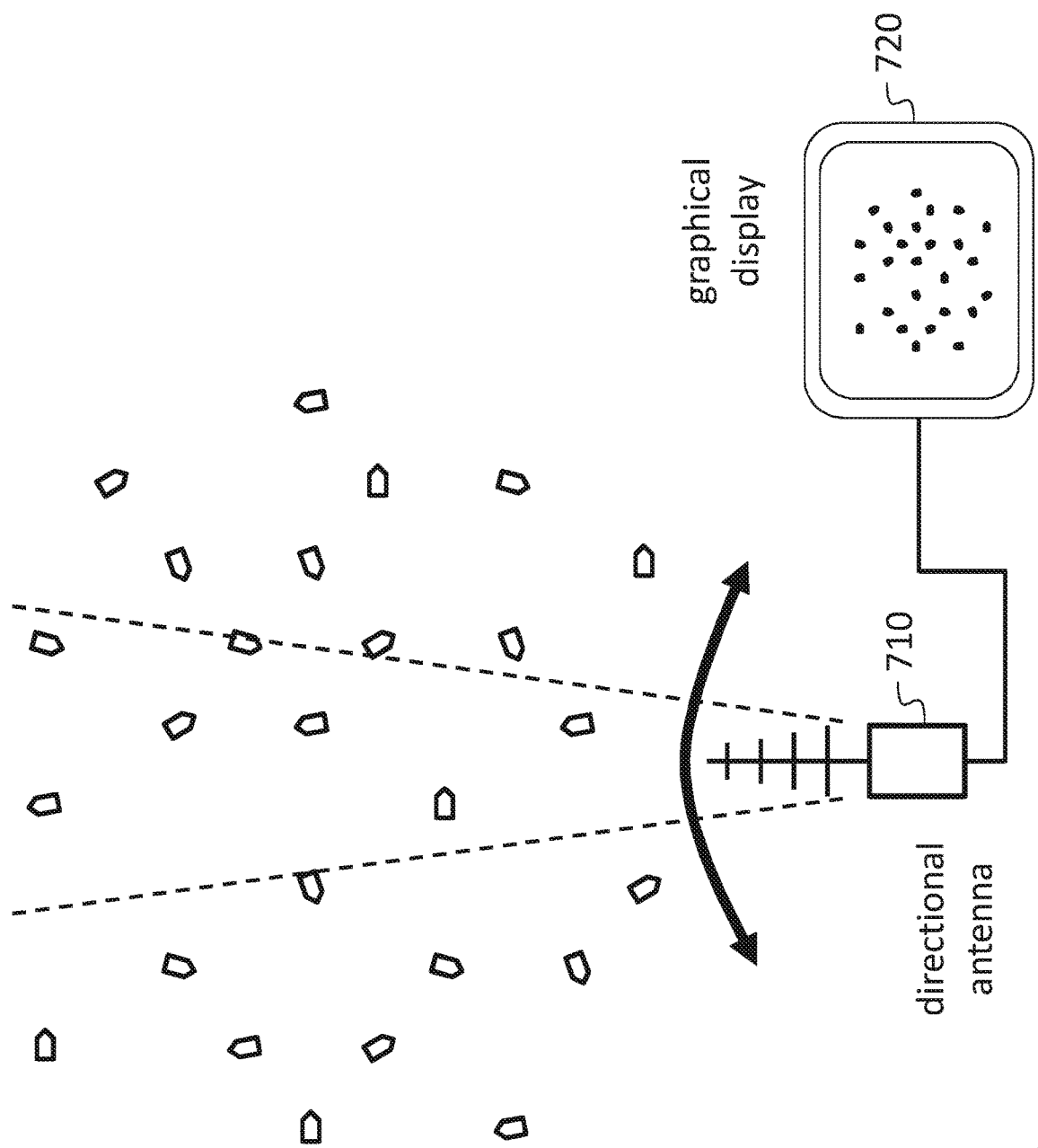
FIG. 7 is a map view of a swarm of agents monitored by a sniffer, according to an embodiment of the present invention.

In one embodiment, illustrated in FIG. 7, the operator makes use of a "sniffer" including a high-gain directional antenna 710 (e.g., an antenna having a gain of at least 5 dBi, i.e., a gain of at least 5 dB relative to that of a hypothetical isotropic antenna pattern) attached to a graphic display screen 720. Together these elements comprise a "sniffer" that can observe the swarm without needing to co-opt the communication channels. A directional antenna 710 may be capable of receiving signals from agents that are considerably more distant than agents from which an omnidirectional antenna (such as the omnidirectional antennas that may be on the agents themselves) would be capable of receiving signals. If it is handheld or on a pivoting mount the antenna 710 may be scanned across the swarm to receive all information available in the broadcast packets. The sniffer receives complete packet information so it may discern locations and other relevant data, such as environmental readings. This information may be plotted on the display screen 720 dynamically, in near real time. If the minimum transmission cycle frequency within the swarm is sufficiently high, it may be possible to sweep the sniffer antenna 710 across the swarm at a relatively high rate (e.g., at 10 degrees per second) and nonetheless capture, during the sweep, at least one transmitted packet from each agent.

Figure 8:
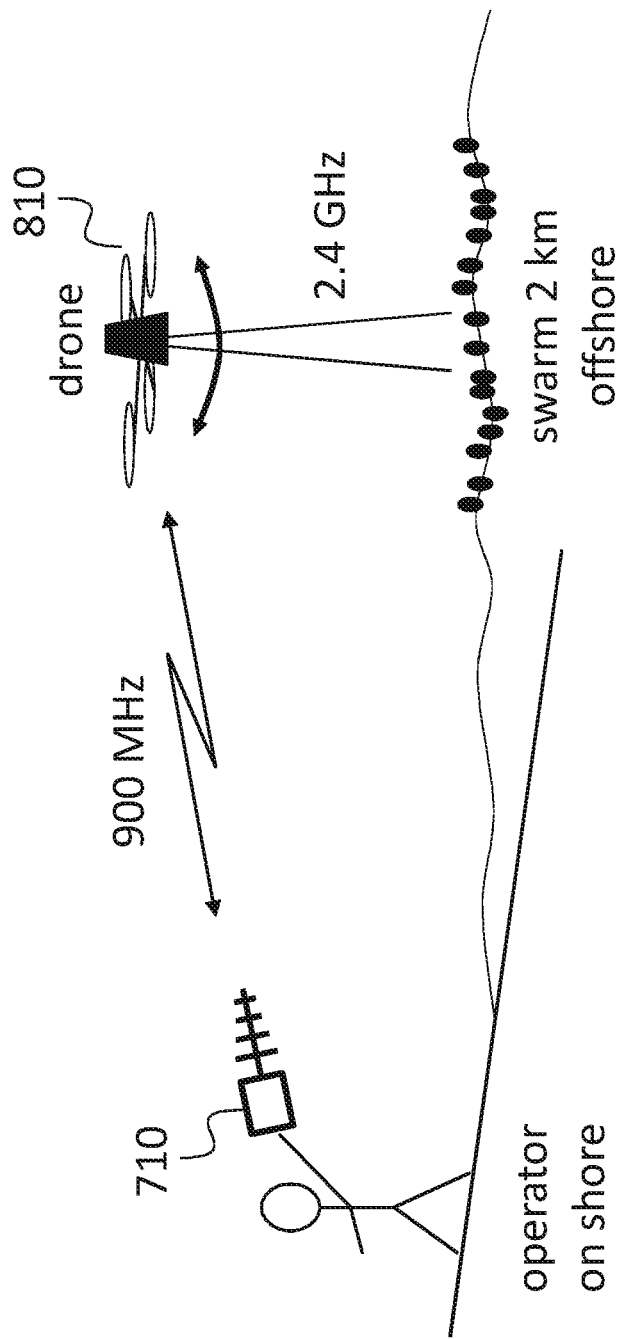
FIG. 8 is a schematic drawing showing the use of a relay drone with a sniffer, according to an embodiment of the present invention.

Monitoring the swarm through a sniffer may impose no additional burden on the swarm communication system, and the broadcast information is available to other operators or other agents. For example, as illustrated in FIG. 8, an aerial drone 810 may be stationed over an ocean surface swarm, where it may gather information from the entire swarm and transmit it to the operator from its higher vantage point.

Radio packets broadcast by the agents may be configured to include additional information that an operator may want to monitor. For example, packets may include information about swarm health, such as the battery level of each agent. In another embodiment packets may include information recorded when the swarm was not in range of the sniffer, such as water temperature readings recorded while an agent was submerged. As long as the information can be expressed in a few dozen bytes, it may be included in the swarm packet without compromising the overall communication system.

Swarm Device

Various robotic vehicles with advanced capabilities for autonomous navigation in real-world settings, such as aerial drones flying through the built environment, or self-driving cars navigating public roadways, may benefit from the features of the communication system described herein. In some cases, these vehicles may operate amongst crowds of other such vehicles, either to make a swarm or just to navigate smoothly in traffic. In these cases, a device incorporating these features, that may readily be attached to a robotic vehicle 920, may be used to give the robotic vehicle 920 up-to-date awareness of neighbors and the ability to swarm.

Figure 9:
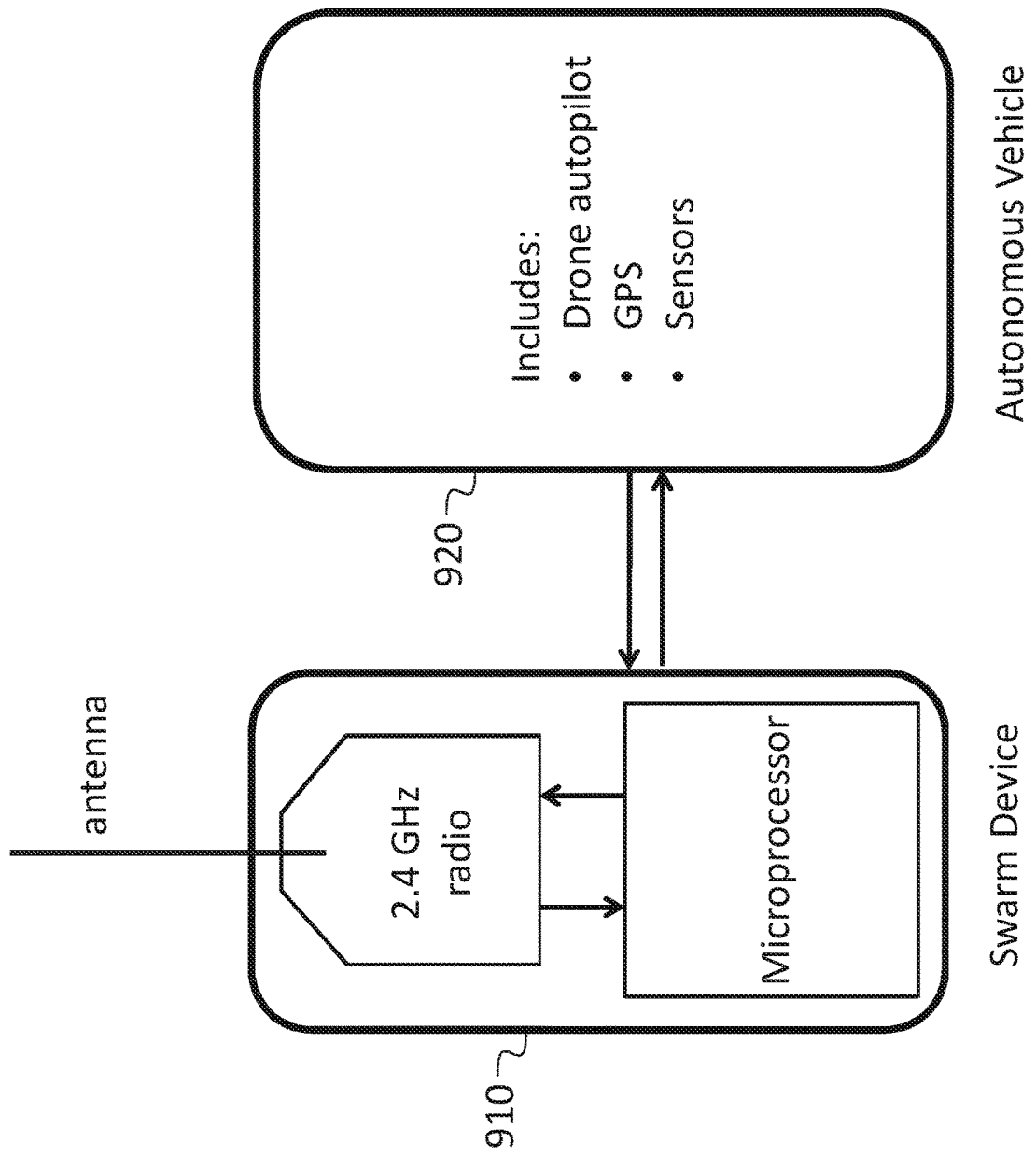
FIG. 9 is a block diagram of a swarm device, according to an embodiment of the present invention.

FIG. 9 illustrates a schematic of a swarm device 910 that can be added to an existing autonomous vehicle 920. The swarm device 910 includes a radio system and a microprocessor. The microprocessor performs the following functions:

1. It maintains a neighbor list. The processor stores relevant information from each neighbor, updating with the latest data and removing neighbors that have not been heard from within a specified persistence duration.

2. If the swarm is scalable, it automatically adjusts its transmission cycle duration based on information from neighbors about the amount of radio crowding in the area.

3. It receives and sends packets to the radio. It may decode the received packets and use them to update the neighbor list. It may take data from the vehicle (GPS, environmental readings, etc.) to create the vehicle data portion of a packet, and it may use command data from neighbors to update the command data to include in the outgoing packet.

4. It queries the autopilot for the latest vehicle dynamic information (e.g. location, velocity, etc.) that will be used in swarm calculations.

5. It provides the vehicle autopilot with information in the neighbor list, such as command data, which may be used to alter behavioral modes.

Equipped with this device, the vehicle 920 may be well-informed about the state of the neighboring vehicles 920 around it, and the autopilot may be able to use this information for navigation. For example, some autonomous vehicles 920 are equipped with collision avoidance behaviors where the vehicle 920 reacts to keep a safe distance from sensed obstructions. The swarm device 910 can be incorporated as an additional obstruction sensor, alerting the vehicle 920 to the proximity of other vehicles 920 (that are broadcasting suitable packets) that may be difficult to sense with computer vision, radar or other on-board equipment.

In another embodiment the attached swarm device 910 may carry out its own swarm processing. Using a swarm algorithm, such as one that seeks to maintain a consistent spacing from neighbors, the microprocessor may calculate a commanded velocity vector (having a direction (the commanded direction) and a magnitude (the commanded speed)) for the vehicle 920 to travel to maintain an ideal relative position within the group. This simple vector may then be the only information that is passed to the vehicle's autopilot.

In another embodiment the device attached to the vehicle 920 may be configured primarily to maximize the ability for a sniffer to monitor vehicles 920 in a group, without regard for coordinated swarming behavior. In such an embodiment, the primary purpose for attaching the device to a population of vehicles 920 may be simply to monitor the population, and the device's self-adjustment of the transmission cycle duration helps assure that a sniffer can glean the most information from the group even as the population density varies.

Other Embodiments

Some embodiments described herein are directed a single swarm of vehicles all communicating on a single frequency (and single channel). It should be understood that the value of the inventions is not limited to such embodiments.

Depending on bandwidth requirements it may be desirable or advantageous to use multiple frequencies, or multiple channels on the same frequency, to enable a larger number of agents to broadcast data without unacceptable interference.

Some embodiments of the communication system may be particularly valuable in any system comprising a large number of agents, whether they form one swarm or not. The rapidly updated broadcasts may allow any agent to be in near-constant contact with any other agent broadcasting enough information for coordinated behavior. This may be relevant for applications such as self-driving cars or delivery drones. In these situations, there may potentially be millions of vehicles, any one of which could come near any other at any time. Pre-established communication links may be too limiting for this number of potential connections. The open broadcast system described in this document allows any vehicle within radio range be detected and assessed by any other within a second or two. This may be useful to expand the range of coordinated interaction beyond the on-board sensing (e.g., computer vision, radar, laser) that such vehicles may be equipped with.

Although for purposes of illustrations some embodiments described herein employ radio transceivers, in other embodiments communications are otherwise established, e.g., using sound waves propagating in water or in air. As used herein, unless otherwise specified, two agents are neighbors (of each other) if and only if they are within communication range of each other. Unless otherwise specified, two agents are within communication range of each other if and only if in the absence of interference at least 10% of the packets transmitted by one agent are successfully received by the other agent. Although for simplicity some embodiments are described for transceivers having symmetric range relationships (i.e., a first transceiver is within range of the transmissions of a second transceiver if and only if the second transceiver is within range of the transmissions of a first transceiver) the invention is not limited to such situations and may readily be employed in embodiments in which the range relationships are not symmetric, e.g., in which some transceivers transmit with higher power than others.

In view of the foregoing, some embodiments provide a swarm communication system. Each of a plurality of transceivers determines a transmission cycle duration, and transmits one packet per transmission cycle, each packet being transmitted at a random point in time within the transmission cycle. The duration of the transmission cycle of a first transceiver may be adjusted according to the number of other transceivers within range of the first transceiver, or according to the number of other transmitters within range of each of the other transmitters that are within range of the first transceiver.

Data processing functions may be performed, in the agent and/or in the transceiver, by a processing circuit. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a swarm communication method and device have been specifically described and illustrated herein, many modifications and variations will be apparent to those skilled in the art. Accordingly, it is to be understood that a swarm communication method and device constructed according to principles of this invention may be embodied other than as specifically described herein. The invention is also defined in the following claims, and equivalents thereof.

What is claimed is:

1. A method for communicating between a plurality of transceivers, the method comprising:
    transmitting a packet, by a first transceiver of the plurality of transceivers, during each transmission cycle of a plurality of transmission cycles executed at an adjustable transmission cycle frequency;
    establishing, at a first time, by the first transceiver, a first transmission cycle frequency; and
    establishing, at a second time, by the first transceiver, a second transmission cycle frequency, higher than the first transmission cycle frequency,
    the establishing of the first transmission cycle frequency comprising establishing the first transmission cycle frequency based on a first set of transceiver counts, each of the transceiver counts of the first set of transceiver counts being a count of transceivers that are, at the first time, within communication range of a respective second transceiver of a first plurality of second transceivers, the first plurality of second transceivers being a subset of the plurality of transceivers, each of the second transceivers of the first plurality of second transceivers being, at the first time, within communication range of the first transceiver,
    the establishing of the second transmission cycle frequency comprising establishing the second transmission cycle frequency based on a second set of transceiver counts, each of the transceiver counts of the second set of transceiver counts being a count of transceivers that are, at the second time, within communication range of a respective second transceiver of a second plurality of second transceivers, the second plurality of second transceivers being a subset of the plurality of transceivers, each of the second transceivers of the second plurality of second transceivers being, at the second time, within communication range of the first transceiver,
    the average of the transceiver counts of the second set of transceiver counts being less than the average of the transceiver counts of the first set of transceiver counts;
    wherein the establishing of the first transmission cycle frequency comprises calculating the first transmission cycle frequency F according to the equation $F=B/(N*T)$, wherein N is the average of the transceiver counts of the first set of transceiver counts, T is a duration of the packet, and B is a constant having a value between 0.1 and 4.0.

2. The method of claim 1, further comprising determining, by a second transceiver of the first plurality of second transceivers, the count of transceivers within communication range of the second transceiver by:
    during a first time interval having a duration of k transmission cycles of the second transceiver, k being a whole number greater than 2:
        receiving a plurality of packets; and
        adding, to a list of transceiver identifiers, a received transceiver identifier when the received transceiver identifier is not already in the list, removing from the list each transceiver identifier not in any packet of the plurality of packets; and
        counting the number of transceiver identifiers in the list.

3. The method of claim 1, further comprising:
    receiving, by the first transceiver, a packet comprising received stamp data and received mode data, the stamp data being a member of an ordered list; and
    when the received stamp data is later in the ordered list than stored stamp data in the first transceiver, overwriting the stored stamp data with the received stamp data, and overwriting stored mode data in the first transceiver with the received mode data; and
    when the received stamp data is not later in the ordered list than the stored stamp data in the first transceiver, leaving the stored stamp data and stored mode data unchanged.

4. A method for communicating between a plurality of transceivers, the method comprising:
    transmitting a packet, by a first transceiver of the plurality of transceivers, during each transmission cycle of a plurality of transmission cycles executed at an adjustable transmission cycle frequency;
    establishing, at a first time, by the first transceiver, a first transmission cycle frequency; and
    establishing, at a second time, by the first transceiver, a second transmission cycle frequency, higher than the first transmission cycle frequency,
    the establishing of the first transmission cycle frequency comprising establishing the first transmission cycle frequency based on a first transceiver count, the first transceiver count being a count of transceivers that are, at the first time, within communication range of the first transceiver, the establishing of the second transmission cycle frequency comprising establishing the second transmission cycle frequency based on a second transceiver count, the second transceiver count being a count of transceivers that are, at the second time, within communication range of the first transceiver, the second transceiver count being less than the first transceiver count;

wherein the establishing of the first transmission cycle frequency comprises calculating the first transmission cycle frequency F according to the equation F=B/(N*T), wherein N is the first transceiver count, T is a duration of the packet, and B is a constant having a value between 0.1 and 4.0.

5. The method of claim 4, further comprising:

receiving, by the first transceiver, a packet comprising received stamp data and received mode data, the stamp data being a member of an ordered list; and when the received stamp data is later in the ordered list than stored stamp data in the first transceiver, overwriting the stored stamp data with the received stamp data, and overwriting stored mode data in the first transceiver with the received mode data; and when the received stamp data is not later in the ordered list than the stored stamp data in the first transceiver, leaving the stored stamp data and stored mode data unchanged.

6. A system, comprising: a plurality of spatially separated agents, each agent comprising a respective transceiver of a corresponding plurality of transceivers, a first transceiver of the plurality of transceivers being configured to:

transmit a packet, during each transmission cycle of a plurality of transmission cycles executed at an adjustable transmission cycle frequency;

establish, at a first time, by the first transceiver, a first transmission cycle frequency; and establish, at a second time, by the first transceiver, a second transmission cycle frequency, higher than the first transmission cycle frequency, the establishing of the first transmission cycle frequency comprising establishing the first transmission cycle frequency based on a first set of transceiver counts, each of the transceiver counts of the first set of transceiver counts being a count of transceivers that are, at the first time, within communication range of a respective second transceiver of a first plurality of second transceivers, the first plurality of second transceivers being a subset of the plurality of transceivers, each of the second transceivers of the first plurality of second transceivers being, at the first time, within communication range of the first transceiver, the establishing of the second transmission cycle frequency comprising establishing the second transmission cycle frequency based on a second set of transceiver counts, each of the transceiver counts of the second set of transceiver counts being a count of transceivers that are, at the second time, within communication range of a respective second transceiver of a second plurality of second transceivers, the second plurality of second transceivers being a subset of the plurality of transceivers, each of the second transceivers of the second plurality of second transceivers being, at the second time, within communication range of the first transceiver, the average of the transceiver counts of the second set of transceiver counts being less than the average of the transceiver counts of the first set of transceiver counts;

wherein the establishing of the first transmission cycle frequency comprises calculating the first transmission cycle frequency F according to the equation F=B/(N*T), wherein N is the average of the transceiver counts of the first set of transceiver counts, T is a duration of the packet, and B is a constant having a value between 0.1 and 4.0.

7. The system of claim 6, further comprising determining, by a second transceiver of the plurality of second transceivers, the count of transceivers within communication range of the second transceiver by:

during a first time interval having a duration of k transmission cycles of the second transceiver, k being a whole number greater than 2:

receiving a plurality of packets; and adding, to a list of transceiver identifiers, a received transceiver identifier when the received transceiver identifier is not already in the list, removing from the list each transceiver identifier not in any packet of the plurality of packets; and counting the number of transceiver identifiers in the list.

8. The system of claim 6, further comprising: receiving, by the first transceiver, a packet comprising received stamp data and received mode data, the stamp data being a member of an ordered list; and when the received stamp data is later in the ordered list than stored stamp data in the first transceiver, overwriting the stored stamp data with the received stamp data, and overwriting stored mode data in the first transceiver with the received mode data; and when the received stamp data is not later in the ordered list than the stored stamp data in the first transceiver, leaving the stored stamp data and stored mode data unchanged.

9. The system of claim 6, further comprising a sniffer comprising a directional antenna, having a gain, in one direction, of at least 5 dBi.

10. A system for providing communications to a swarm of vehicles, the system comprising a plurality of transceivers, a first transceiver of the plurality of transceivers being configured to: be mechanically and electrically connected to a vehicle;

transmit a packet, by a first transceiver of the plurality of transceivers, during each transmission cycle of a plurality of transmission cycles executed at an adjustable transmission cycle frequency; establish, at a first time, by the first transceiver, a first transmission cycle frequency; and establish, at a second time, by the first transceiver, a second transmission cycle frequency, higher than the first transmission cycle frequency, the establishing of the first transmission cycle frequency comprising establishing the first transmission cycle frequency based on a first set of transceiver counts, each of the transceiver counts of the first set of transceiver counts being a count of transceivers that are, at the first time, within communication range of a respective second transceiver of a first plurality of second transceivers, the first plurality of second transceivers being a subset of the plurality of transceivers, each of the second transceivers of the first plurality of second transceivers being, at the first time, within communication range of the first transceiver, the establishing of the second transmission cycle frequency comprising establishing the second transmission cycle frequency based on a second set of transceiver counts, each of the transceiver counts of the second set of transceiver counts being a count of transceivers that are, at the second time, within communication range of a respective second transceiver of a second plurality of second transceivers, the second plurality of second transceivers being a subset of the plurality of transceivers, each of the second transceivers of the second plurality of second transceivers being, at the second time, within communication range of the first transceiver, the average of the transceiver counts of the second set of transceiver counts being less than the average of the transceiver counts of the first set of transceiver count;

wherein the establishing of the first transmission cycle frequency comprises calculating the first transmission cycle frequency F according to the equation F=B/(N*T), wherein N is the average of the transceiver counts of the first set of transceiver counts, T is a duration of the packet, and B is a constant having a value between 0.1 and 4.0.

11. The system of claim 10, wherein the first transceiver is configured to send, to the vehicle, information about the location of other nearby transceivers of the plurality of transceivers.

12. The system of claim 10, wherein the first transceiver is configured to send, to the vehicle, a commanded velocity vector.

13. The method of claim 1, wherein the first time is later than the second time.

14. The method of claim 4, wherein the first time is later than the second time.

15. The system of claim 6, wherein the first time is later than the second time.

16. The system of claim 10, wherein the first time is later than the second time.

* * * * *